United States Patent Office 3,424,764
Patented Jan. 28, 1969

3,424,764
IMINONAPHTHO[2,3-d]-1,3-DITHIOLE-4,9-DIONES
William Lindsay Mosby, North Plainfield, N.J., assignor to American Cyanamid Company, Stamford, Conn., a corporation of Maine
No Drawing. Filed June 16, 1965, Ser. No. 464,554
U.S. Cl. 260—327                     4 Claims
Int. Cl. A01n 11/00; C07d 71/00; C09b 49/00

ABSTRACT OF THE DISCLOSURE 2-iminonaphtho[2,3-d]-1,3-dithiole-4,9-diones of the formula:

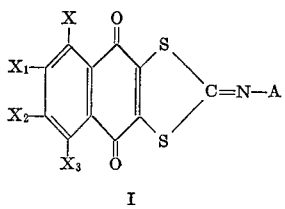

wherein A is

—NH—SO$_2$—aryl, —NH—CO—aryl, —CN or —SO$_2$—aryl; X, X$_1$, X$_2$ and X$_3$ are hydrogen, halogen, lower alkoxy, amino, lower alkanamido and nitro; R and R$_1$ are lower alkyl or, taken together, are polymethylene of 4 to 5 carbons; aryl is monocyclic such as phenyl or tolyl. alkyl, lower alkoxy, amino, lower alkanamido and nitro; R and R$_1$ are lower alkyl or, taken together, are polymethylene of 4 to 5 carbons; aryl is monocyclic such as phenyl or tolyl. These compounds are prepared by reacting a corresponding 2,3-dichloro-1,4-naphthoquinone with a dialkali metal salt of the appropriate N-substituted imidodithiocarbonic acid in an inert solvent. The compounds are useful as pigments, dyes, and herbicides.

This invention relates to a new class of compounds. More particularly, it relates to 2-iminonaphtho[2,3-d]-1,3-dithiole-4,9-diones in which the imino group is subtituted by nitrogen and/or sulfur-containing radicals. These compounds are represented by Formula I as follows:

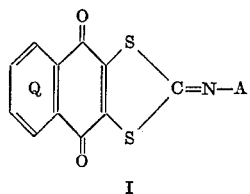

wherein A is selected from the group consisting of

—NH—SO$_2$—aryl, —NH—CO—aryl, —SO$_2$—aryl and —CN; any substituents on ring Q being halogen, lower alkyl, lower alkoxy, amino, lower alkanamido or nitro; R and R$_1$ are lower alkyl or, taken together, are polymethylene of 4 to 5 carbons; and aryl is monocyclic.

The compounds of this invention are highly colored, water-insoluble and oil-soluble, crystalline materials having high melting points. They are useful as pigments and dyes. Also, as a class, they have shown biocidal, particularly herbicidal activity, as witnessed by 100% kill of corn and wheat seeds at a concentration of 500 p.p.m. or less.

The compounds of Formula I can be prepared by reacting a 2,3-dichloro-1,4-naphthoquinone (Formula II) with a dialkali metal salt of the appropriate N-substituted imidodithiocarbonic acid of Formula III as shown in the following Equation 1:

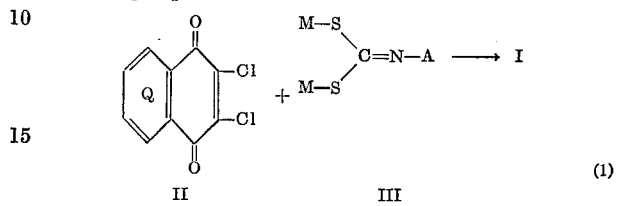

(1)

wherein M is sodium or potassium (i.e., an alkali metal) and Q and A are as defined above.

Reaction 1 is carried out in an inert solvent such as dimethylformamide. Approximately equimolecular amounts of the two reactants are used, although it is advantageous to use a slight excess of the imidodithiocarbonic acid salt. The reaction temperature is not critical; ambient temberatures are normally used. The products can be isolated and purified, if desired, by conventional methods.

Compounds of Formula II which may be used in reaction 1 include 2,3-dichloro-1,4-naphthoquinone; lower alkyl-2,3-dichloro-1,4-naphthoquinones such as 6-methyl-2,3-dichloro-1,4-naphthoquinone and 5,8-dimethyl-2,3-dichloro - 1,4 - naphthoquinone; amino - 2,3 - dichloro-1,4-naphthoquinones such as 5-amino-2,3-dichloro-1,4-naphthoquinone; lower alkoxy-2,3-dichloro-1,4-naphthoquinones such as 5,8-dimethoxy-2,3-dichloro-1,4-naphthoquinone; halogenated 2,3-dichloro-1,4-naphthoquinones such as 2,3,5,6,7,8-hexachloro-1,4-naphthoquinone; nitrated 2,3-dichloro-1,4-naphthoquinones such as 5-nitro-2,3-dichloro-1,4-naphthoquinone; and lower alkanamido-2,3-dichloro-1,4-naphthoquinones such as 5-acetamido-2,3-dichloro-1,4-naphthoquinone.

As indicated above, five classes of compounds of Formula III may be used in reaction 1. These are shown by Formulas IIIa, IIIb, IIIc, IIId and IIIe.

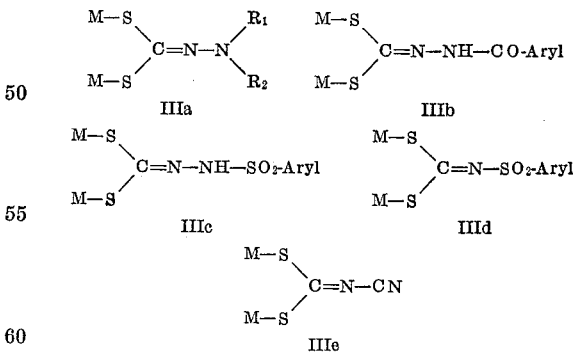

Examples of IIIa include the dialkali metal salts of 3,3-dimethyldithiocarbazic acid, 3,3-tetramethylenedithiocarbazic acid, etc.

Examples of IIIb include the dialkali metal salts of 3-benzoyldithiocarbazic acid, etc.

Examples of IIIc include the dialkali metal salts of 3-phenylsulfonyldithiocarbazic acid, etc.

Examples of IIId include the dialkali metal salts of p-tolylsulfonyldithioimidocarbonic acid, etc.

IIIe is a dialkali metal salt of cyanodithioimidocarbonic acid.

The following examples, in which parts and percentages are by weight, are presented to illustrate this invention.

EXAMPLE 1

2-p-tolylsulfonyliminonaphtho[2,3-d]-1,3-dithiole-4,9-dione

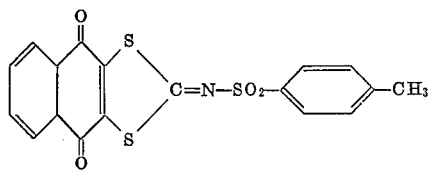

A suspension of 4.25 parts (0.013 mole) of dipotassium p-tolylsulfonyldithioimidocarbonic acid in 20 parts of dimethylformamide is added to a solution of 2.27 (0.01 mole) of 2,3-dichloro-1,4-naphthoquinone in 25 parts of dimethylformamide at 50° C. After about one hour, the insoluble materials are filtered off, washed with water and recrystallized from glacial acetic acid and nitromethane. The brown crystalline product melts at about 227.5–228.5° C.

The compound, 6-methyl-2,-p-tolylsulfonyliminonaphtho[2,3-d]-1,3-dithiole-4,9-dione is obtained by the same procedure if an equimolar amount of 6-methyl-2,3-dichloro-1,4-naphthoquinone is substituted for the naphthoquinone used above.

EXAMPLE 2

2-p-tosylsulfonylimino-5,6,7,8-tetrachloronaphtho-[2,3-d]-1,3-dithiole-4,9-dione

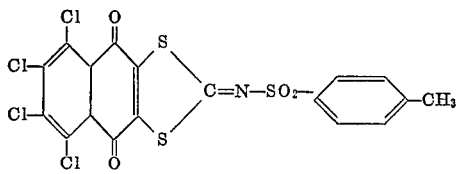

The procedure of Example 1 is followed, substituting 3.65 parts of hexachloro-1,4-naphthoquinone for the 2,3-dichloro-1,4-naphthoquinone. The product, after recrystallization from toluene, melts at 285.8–287.8° C.

EXAMPLE 3

2-cyanoiminonaphtho[2,3-d]-1,3-dithiole-4,9-dione

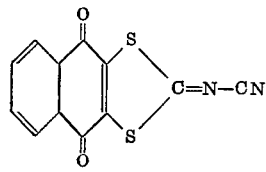

A mixture of 2.27 parts (0.01 mole) of 2,3-dichloro-1,4-naphthoquinone and 2.15 parts (0.011 mole) of dipotassium cyanodithioimidocarbonate in about 15 parts of dimethylformamide is triturated and allowed to stand for about one hour at ambient temperature. The precipitate is filtered off, washed with water, methanol and ethyl acetate, and recrystallized from benzene. The yellow crystalline product melts at 238.5–240° C.

Following the same procedure except for the replacement of the naphthoquinone used therein with 5,8-dimethoxy-2,3-dichloro-1,4-naphthoquinone, there is obtained the compound 5,8-dimethoxy-2-cyanoiminonaphtho[2,3-d]-1,3-dithiole-4,9-dione.

EXAMPLE 4

2-benzoylhydrazononaphtho[2,3-d]-1,3-dithiole-4,9-dione

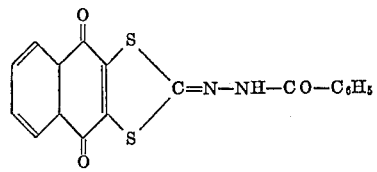

A solution of 2.90 parts (0.01 mole) of dipotassium benzoyldithiocarbazate in 20 parts of dimethylformamide is added to a solution of 2.27 parts (0.01 mole) of 2,3-dichloro-1,4-naphthoquinone and 35 parts of dimethylformamide. After one hour at ambient temperature, the reaction mixture is mixed with 25 parts of water. The precipitate is filtered off and washed. The violet product, after recrystallization from nitromethane, melts at 241–242° C.

Following the same procedure except for the replacement of the naphthoquinone used therein with 5-amino-2,3-dichloro-1,4-naphthoquinone, the compound 5-amino-2-benzoylhydrazononaphtho[2,3-d]-1,3 - dithiole - 4,9-dione is obtained.

EXAMPLE 5

2-dimethylhydrazononaphtho[2,3-d]-1,3-dithiole-4,9-dione

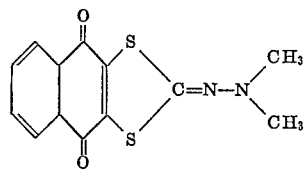

A solution of 2.20 parts (0.01 mole) of dipotassium N,N-dimethyldithiocarbazate is added to a solution of 2.27 parts (0.01 mole) 2,3-dichloro-1,4-naphthoquinone and 35 parts of dimethylformamide. After one hour at ambient temperature, the reaction mixture is mixed with 25 parts of water. The precipitate is filtered off and washed. The maroon product melts at 168–170° C.

Following the same procedure except for the replacement of the naphthoquinone with 5-acetamido-2,3-dichloro-1,4-naphthoquinone, the compound 5-acetamido-2-dimethylhydrazononaphtho[2,3-d]-1,3-dithiole-4,9 - dione is obtained.

EXAMPLE 6

2-(1-pyrrolidinylimino)naphtho[2,3-d]-1,3-dithiole-4,9-dione

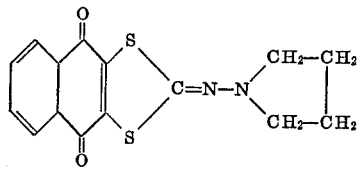

A solution of 2.38 parts (0.01 mole) of dipotassium N-1-pyrrolidinyldithioimidocarbonate and 20 parts of dimethylformamide is added to a solution of 2.27 (0.01 mole) of 2,3-dichloro-1,4-naphthoquinone and 45 parts of dimethylformamide at a temperature of 10° C. After about one hour, 50 parts of water are added and the precipitate is filtered off and washed. The red product, after recrystallization from cyclohexane, melts at 171.5–172.5° C.

Following the same procedure except for the replacement of the naphthoquinone with 5-nitro-2,3-dichloro-1,4-naphthoquinone, the compound 5-nitro-2-(1-pyrrolidinylimino)naphtho[2,3-d]-1,3-dithiole-4,9-dione is obtained.

EXAMPLE 7

2-phenylsulfonylhydrazononaphtho[2,3-d]-1,3-dithiole-4,9-dione

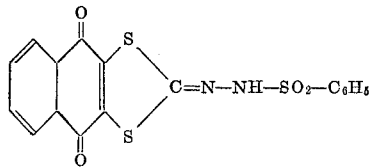

The general procedure of Example 6 is followed substituting 3.24 parts of dipotassium N-phenylsulfonyldithiocarbazate for the N-1-pyrrolidinyldithioimidocarbonate. The red product melts at 225.5–226.5° C.

I claim:
1. A compound of the formula:

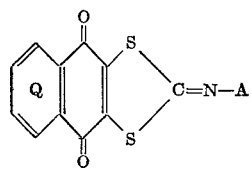

wherein A is

—NH—SO$_2$—aryl, —NH—CO—aryl or —SO$_2$—aryl; R and R$_1$ are lower alkyl or, when taken together, polymethylene of 4–5 carbons; aryl is phenyl or tolyl; and any substituents on ring Q being tetrachloro, 5,8-dimethoxy, 6-methyl, 5-nitro- 5-acetamido or 5-amino.

2. The compound 2-p-tolylsulfonyliminonaphtho-[2,3-d]-1,3-dithiole-4,9-dione.
3. The compound 2-p-tosylsulfonylimino-5,6,7,8-tetrachloronaphtho[2,3-d]-1,3-dithiole-4,9-dione.
4. The compound 2-benzoylhydrazononaphtho[2,3-d]-1,3-dithiole-4,9-dione.

References Cited
UNITED STATES PATENTS
2,547,723  4/1951  Sundholm _____ 167—33
2,690,988  10/1954  Jones et al. _____ 167—33

JAMES A. PATTEN, *Primary Examiner.*

U.S. Cl. X.R.

260—293.4, 326.84; 71—90

UNITED STATES PATENT OFFICE
CERTIFICATE OF CORRECTION

Patent No. 3,424,764                                              January 28, 1969

William Lindsay Mosby

It is certified that error appears in the above identified patent and that said Letters Patent are hereby corrected as shown below:

Column 1, line 31, before "alkoxy" insert -- alkyl, lower --; lines 34 to 37, cancel "alkyl, lower alkoxy, amino, lower alkanamido and nitro; R and $R_1$ are lower alkyl or, taken together, are polymethylene of 4 to 5 carbons; aryl is monocyclic such as phenyl or tolyl."; lines 60 to 63,

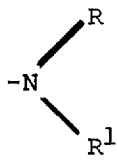     should read     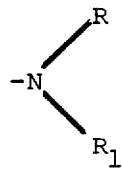

Column 2, line 26, "tembperatures" should read -- temperatures --.

Signed and sealed this 7th day of April 1970.

(SEAL)
Attest:

EDWARD M. FLETCHER, JR.                            WILLIAM E. SCHUYLER, JR.
Attesting Officer                                                   Commissioner of Patents